(12) United States Patent
Hahn et al.

(10) Patent No.: US 8,897,737 B2
(45) Date of Patent: Nov. 25, 2014

(54) SYSTEM AND METHOD FOR MANAGING INTERACTION BETWEEN A USER AND AN INTERACTIVE SYSTEM

(75) Inventors: Jury Hahn, New York, NY (US); Daniel Albritton, New York, NY (US)

(73) Assignee: Play Megaphone, New York, NY (US)

( * ) Notice: Subject to any disclaimer, the term of this patent is extended or adjusted under 35 U.S.C. 154(b) by 1172 days.

(21) Appl. No.: 12/336,406

(22) Filed: Dec. 16, 2008

(65) Prior Publication Data

US 2009/0156179 A1    Jun. 18, 2009

Related U.S. Application Data

(60) Provisional application No. 61/014,243, filed on Dec. 17, 2007.

(51) Int. Cl.
| | | |
|---|---|---|
| *H04M 11/00* | (2006.01) | |
| *H04L 29/08* | (2006.01) | |
| *G06Q 10/10* | (2012.01) | |
| *G06Q 30/02* | (2012.01) | |
| *H04L 12/58* | (2006.01) | |
| *H04W 4/14* | (2009.01) | |

(52) U.S. Cl.
CPC ............ *H04L 67/025* (2013.01); *G06Q 10/101* (2013.01); *G06Q 30/02* (2013.01); *G06Q 30/0209* (2013.01); *G06Q 30/0241* (2013.01); *G06Q 30/0267* (2013.01); *G06Q 30/0283* (2013.01); *H04L 51/066* (2013.01); *H04L 51/10* (2013.01); *H04L 51/18* (2013.01); *H04L 51/20* (2013.01); *H04L 51/38* (2013.01); *H04M 2203/1066* (2013.01); *H04W 4/14* (2013.01)
USPC ............... 455/403; 715/716; 463/40

(58) Field of Classification Search
USPC ......... 463/9, 29, 40, 42; 273/138.2; 379/88.16, 265.02; 345/589; 434/308; 455/456.1, 418, 550.1, 453, 403; 709/231, 207; 725/81, 74, 119; 715/719, 716; 718/105
See application file for complete search history.

(56) References Cited

U.S. PATENT DOCUMENTS

| | | | | |
|---|---|---|---|---|
| 6,080,064 A * | 6/2000 | Pieterse et al. | ................... | 463/42 |
| 6,227,974 B1 * | 5/2001 | Eilat et al. | ........................ | 463/40 |
| 6,526,275 B1 * | 2/2003 | Calvert | ......................... | 455/418 |
| 6,569,012 B2 * | 5/2003 | Lydon et al. | ....................... | 463/9 |
| 6,663,105 B1 * | 12/2003 | Sullivan et al. | ............. | 273/138.2 |
| 6,789,263 B1 * | 9/2004 | Shimada et al. | ............... | 725/119 |

(Continued)

FOREIGN PATENT DOCUMENTS

| | | |
|---|---|---|
| JP | 2001-125973 | 5/2001 |
| JP | 2002-035425 | 2/2002 |

(Continued)

OTHER PUBLICATIONS

Korean Office Action received regarding Korean Patent Appication No. 10-2010-7012977 dated Jun. 13, 2011, 3 pages, with translation, 2 pages.

(Continued)

*Primary Examiner* — Gerald Johnson
(74) *Attorney, Agent, or Firm* — Foley & Lardner LLP

(57) ABSTRACT

A scalable system is provided for managing the interaction of cell phone users and users of other communication devices with public and private digital display systems and other interactive digital devices and systems.

118 Claims, 8 Drawing Sheets

(56) References Cited

U.S. PATENT DOCUMENTS

| | | | |
|---|---|---|---|
| 6,959,166 B1* | 10/2005 | Gabai et al. | 434/308 |
| 6,996,413 B2 | 2/2006 | Inselberg | |
| 7,086,946 B2* | 8/2006 | Yoshida | 463/23 |
| 7,285,046 B2* | 10/2007 | Papulov | 463/29 |
| 7,303,470 B2* | 12/2007 | George et al. | 463/25 |
| 7,312,798 B2* | 12/2007 | Yach et al. | 345/589 |
| 7,450,954 B2* | 11/2008 | Randall | 455/456.1 |
| 7,742,782 B2* | 6/2010 | Kim et al. | 455/550.1 |
| 7,824,268 B2* | 11/2010 | Harvey et al. | 463/42 |
| 7,840,991 B2 | 11/2010 | Dusenberry et al. | |
| 7,865,566 B2* | 1/2011 | Ashtekar et al. | 709/207 |
| 2002/0002611 A1* | 1/2002 | Vange | 709/223 |
| 2002/0023265 A1* | 2/2002 | Metcalf | 725/74 |
| 2002/0143652 A1* | 10/2002 | Beckett | 705/26 |
| 2002/0165630 A1* | 11/2002 | Arthur et al. | 700/91 |
| 2003/0003997 A1* | 1/2003 | Vuong et al. | 463/42 |
| 2003/0144004 A1* | 7/2003 | Canova et al. | 455/453 |
| 2004/0005900 A1 | 1/2004 | Zilliacus | |
| 2004/0005926 A1* | 1/2004 | LeFroy | 463/42 |
| 2004/0151285 A1* | 8/2004 | Sychta | 379/88.16 |
| 2004/0165006 A1 | 8/2004 | Kirby et al. | |
| 2004/0171381 A1 | 9/2004 | Inselberg | |
| 2004/0174270 A1* | 9/2004 | Choi | 340/870.02 |
| 2004/0217970 A1* | 11/2004 | Fujita | 345/589 |
| 2005/0039210 A1* | 2/2005 | Dusenberry et al. | 725/81 |
| 2005/0070359 A1* | 3/2005 | Rodriquez et al. | 463/42 |
| 2005/0132115 A1* | 6/2005 | Leach | 710/305 |
| 2005/0138560 A1* | 6/2005 | Lee et al. | 715/719 |
| 2005/0175218 A1* | 8/2005 | Vertegaal et al. | 382/103 |
| 2006/0147026 A1* | 7/2006 | Statham et al. | 379/265.02 |
| 2006/0179127 A1 | 8/2006 | Randall | |
| 2006/0224761 A1* | 10/2006 | Howarth et al. | 709/231 |
| 2006/0287105 A1* | 12/2006 | Willis | 463/42 |
| 2006/0293958 A1* | 12/2006 | Koenig | 705/14 |
| 2007/0061142 A1* | 3/2007 | Hernandez-Abrego et al. | 704/247 |
| 2007/0184902 A1* | 8/2007 | Liu et al. | 463/42 |
| 2007/0220092 A1* | 9/2007 | Heitzeberg et al. | 709/204 |
| 2008/0125140 A1* | 5/2008 | Udani | 455/456.1 |
| 2008/0176660 A1* | 7/2008 | Kelly et al. | 463/42 |
| 2008/0181140 A1* | 7/2008 | Bangor et al. | 370/261 |
| 2008/0215994 A1* | 9/2008 | Harrison et al. | 715/757 |
| 2009/0088252 A1* | 4/2009 | Nicely et al. | 463/42 |
| 2009/0149246 A1* | 6/2009 | Opaluch | 463/29 |

FOREIGN PATENT DOCUMENTS

| | | |
|---|---|---|
| JP | 2002-133004 | 5/2002 |
| JP | 2007-502165 | 2/2007 |
| WO | WO 2004/004857 | 1/2004 |
| WO | WO 2006/052837 | 5/2006 |

OTHER PUBLICATIONS

International Search Report for PCT Application No. PCT/US2008/087042.

International Search Report for PCT /US/2008087042, dated Jul. 17, 2012, 7 pages.

Translation of office action received regarding Japanese Application No. 2010-538234, dispatch date May 21, 2013, 2 pages.

* cited by examiner

SYSTEM AND METHOD FOR MANAGING INTERACTION BETWEEN A USER AND AN INTERACTIVE SYSTEM

This application claims priority to U.S. Provisional Patent Application No. 61/014,243, filed 17 Dec. 2007, which is incorporated herein by reference.

TECHNICAL FIELD

The present invention is related to systems and methods that provide interactive control of devices and systems with a mobile communications device and, in particular, to a scalable system and method to provide such interactive control of multiple interactive systems in a multi-user environment.

BACKGROUND

In the modern media world, both in-home and out-of-home media is becoming more advanced as it becomes based more on digital signage (e.g., video displays) and web-based ads that are replacing traditional static billboards. However, these video displays, also known as digital video billboards, suffer from the problem that their static billboard predecessors did: they are not interactive.

Making signs interactive has been pursued before, but has largely been a failure due to inherent deficiencies in the designs of previous systems. Previous systems have relied on software downloads to a mobile device, which requires that the devices be capable of downloading and running third party software. Some mobile devices, such as inexpensive cell phones for example, simply don't have such capability. Other mobile devices, such as higher-end cell phones and smart phones which do have such capability, still require a version of the third party software that is customized for that device. And, since there are hundreds of varieties of mobile devices that are constantly changing, the task of writing the software for each one is a never-ending task. Another requirement of previous systems has been Bluetooth® or IEEE 802.11 (Wi-Fi) compatibility to provide a communications channel that can be used to transmit data. Again, many mobile devices do not have these capabilities and are therefore unable to interact with the prior art systems.

One prior art system, described in U.S. Pat. No. 7,450,954, titled "System and Method for Location-based Interactive Content," allows users who are viewing a display screen in a public location to send SMS messages and voice messages from cell phones to a centralized content server. A plurality of "location-based displays" with unique identifiers (e.g., telephone numbers or SMS short codes) are connected to the content server and each is controlled by a dedicated communications management console in the content server including hardware and software that records a user's inputs and modifies a corresponding digital display in response. This system also includes a content management module in the content server that creates content for each display screen. One significant disadvantage of this system is that the load placed on the centralized content server is enormous, making scaling and load-balancing very difficult as the number of users and the number of displays increases. Another disadvantage of this system is that it requires, at the least, SMS capability in the mobile devices. Older cell phones may not be SMS capable. Additionally, some users may not know how to send SMS messages even if their mobile devices have the capability.

Another prior art system, described in International Publication WO2004/004857, titled "System and Method for Playing an Interactive Game Using a Mobile Device," provides a centralized game server that allows mobile device users to play coordinated games on a game display. This system suffers from one of the disadvantages described above. It does not scale easily because the centralized server is burdened with all of the tasks of managing transmissions to and from the mobile devices, running the game software and managing the game display.

Yet another prior art system, described in International Publication WO2006/052837, titled "A system and Method for Interactive Marketing," uses a proxy gateway to connect mobile device users to an interactive display by connecting two dissimilar networks. This system requires dedicated software (a content manager and a client location tagger) to run on a computer local to the interactive display.

All of the systems described above are also limited to the control of interactive displays and do not address the control of other digital devices or interactive systems. FIG. 1 illustrates the general configuration of these prior art systems, where the interaction between a user's device and a local display is managed over a network by a remote content server.

SUMMARY

A method according to one embodiment of the present invention includes receiving input data from a communication device through a first network connection, where the input data originates from an interaction of a user with an interactive system, converting the input data into commands for an application, where the application is local to the interactive system and is configured to control the interactive system, and sending the commands from a command server to the application through a second network connection to a command interface, where the command interface is configured to control the application. In one embodiment, the application and the command interface may reside on a local controller which, together with an interactive device may comprise the interactive system.

A system, according to one embodiment of the present invention, includes a number of call servers configured to receive call data from a communication device through a first network, where the call data represents user interactions with an interactive system and where the number of call servers is scalable to manage a dynamic call load, a data converter coupled to the number of call servers, where the data converter is configured to convert the call data into commands for an application, where the application is local to an interactive system and is configured to control the interactive system, and a command server coupled to the data converter, where the command server is configured to send the commands through a second network connection to a command interface, where the command interface is configured to control the application. The system may also include a load balancer, coupled to the call servers, to receive call data from the first network and to distribute the call data to the call servers. In one embodiment, the interactive system includes a local controller and an interactive device and where the local controller includes the application and the command interface.

Embodiments of the present invention also include computer readable media having instructions thereon which, when read by a computer, instruct the computer to perform operations to perform the aforementioned methods.

One embodiment of the present invention is a system that allows users to interact with interactive displays, devices and systems by using a telephone, such as wcell phones for example, as an interface device.

In one embodiment, a user can use the keypad or microphone on the phone to send input to the system of the present invention. The system then captures, processes, and uses the input for different types of interactive experiences, including visual applications running on displays or physical devices.

The system of the present invention is different from an Interactive Voice Response (IVR) system. IVR systems only allow the user to stay within the confinements of the phone audio channel. The system of the present invention is not so limited and allows for voice control of arbitrary applications, systems and devices.

In one embodiment, during or after a user interaction with the system, the system of the present invention can contact that user using a variety of methods. Where the user's communication device is a mobile phone, the system may generate an automated return voice call or send text or multimedia messages such as SMS and MMS messages, for example. These messages may be related to the user's interactive experience and can offer the user downloadable content for their mobile phone which is targeted to the user's location or demographics. Where the user's communication device is a computer such as a desktop or laptop computer, for example, the system may additionally transmit web pages or links to web pages that may offer products and services to the user related to the interactive experience or to the user's location or demographics.

BRIEF DESCRIPTION OF THE DRAWINGS

The present invention is illustrated by way of example and not by way of limitation in the figures of the accompanying drawings, in which.

DETAILED DESCRIPTION

Figure 1:
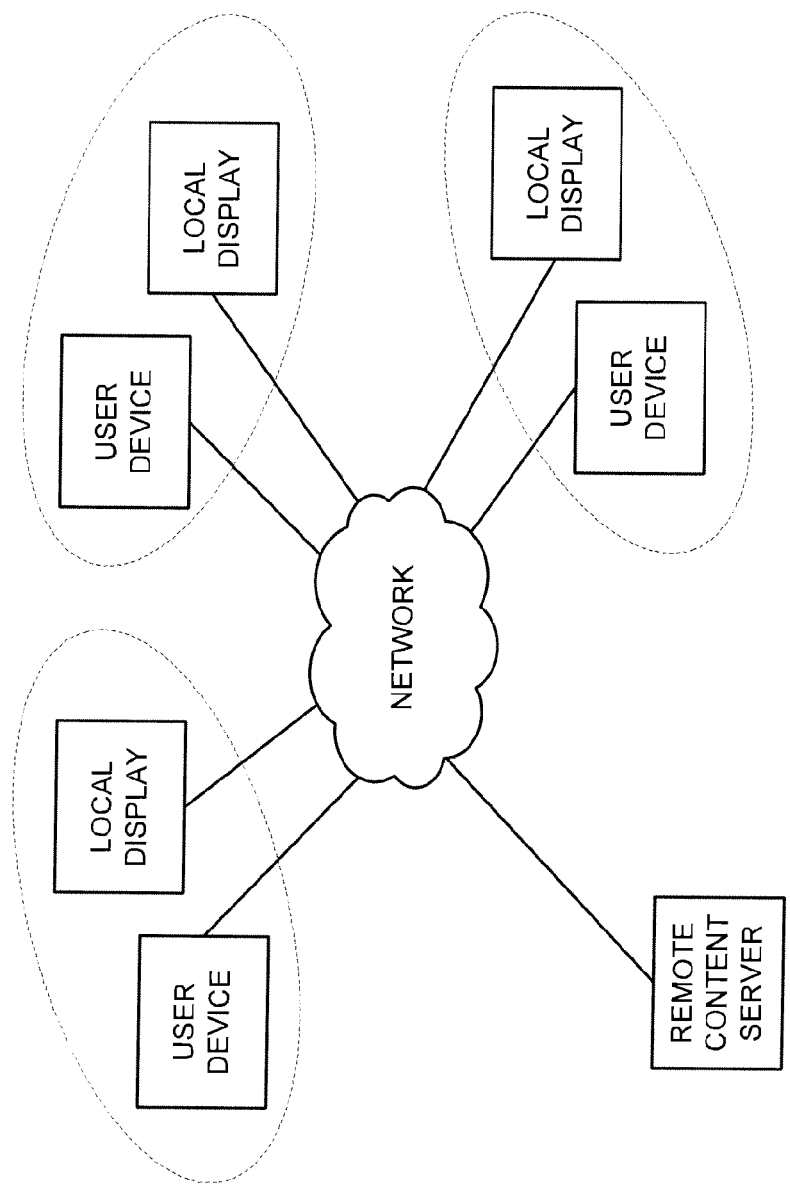
FIG. 1 illustrates the architecture of a prior art system.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well-known materials or methods have not been described in detail in order to avoid unnecessarily obscuring the present invention.

The present invention includes operations, which will be described below. The operations of the present invention may be embodied in computer-executable instructions, which may be used to cause a general-purpose or special-purpose processor programmed with the instructions to perform the operations. Alternatively, the operations maybe performed by a combination of hardware and software.

The present invention may be provided as a computer program product, or software, that may include a computer-readable storage medium having stored thereon instructions, which may be used to program a computer system (or other electronic devices) to perform a process according to the present invention. A computer-readable storage medium includes any mechanism for storing or transmitting information in a form (e.g., software, processing application) readable by a computer. The computer-readable medium may include, but is not limited to: magnetic storage media (e.g., floppy diskette); optical storage media (e.g., CD-ROM); magneto-optical storage media; read only memory (ROM); random access memory (RAM); erasable programmable memory (e.g., EPROM and EEPROM); flash memory; or other type of medium suitable for storing electronic instructions.

Some portions of the description that follow are presented in terms of algorithms and symbolic representations of operations on data bits that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The present invention may be described herein in terms of lists of alternative embodiments, elements, components and the like. These lists are intended to be inclusive and not exclusive. In particular, the conjunction "or" should be interpreted as a Boolean OR function. For example, the list A or B means A only or B only and both A and B. Additionally, the list "one or more of A and B" means one or more of A, one or more of B, or one or more of both A and B.

Figure 2:
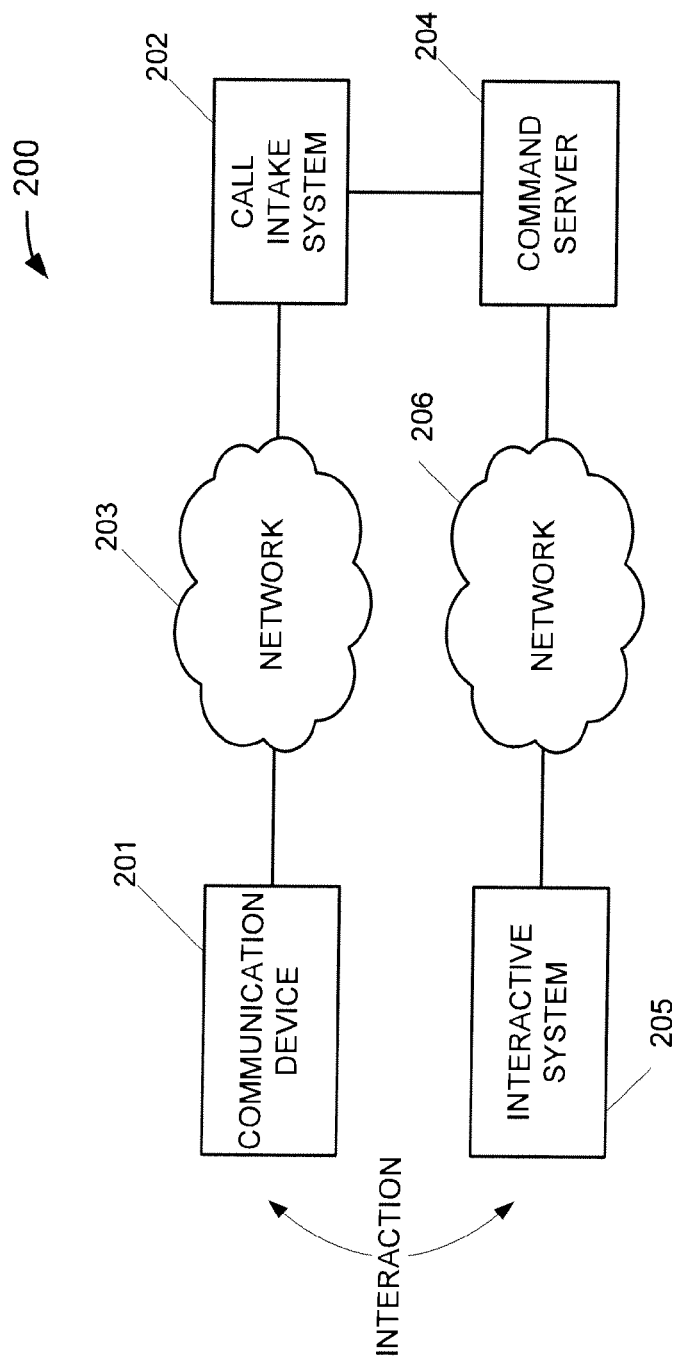
FIG. 2 illustrates a generic block diagram of an embodiment of the system of the present invention.

FIG. 2 illustrates a generic block diagram of an embodiment 200 of the system of the present invention. In FIG. 2, a communication device 201 is connected to a call intake system 202 through a network 203, which may be, for example, a public switched telephone network, the Internet or other type of packet switched network as is known in the art. Communication device 201 may be directly connected to network 203 or indirectly connected through another network (not shown), such as a cellular network, an IEEE 802.11 (Wi-Fi) network, a Bluetooth network or the like. Communication device 201 may be, for example, a mobile phone, a fixed or mobile computer system or similar communication device capable of generating data such as DTMF tones, voice data, SMS messages and MMS messages for example. Call intake system 202 may convert call data to commands, which are delivered by a command server 204 to an interactive system 205 through a network 206. Network 206 may be the same as network 203 or a different network. The interactive system may include a controller and an interactive device configured for interaction with a user of the communication device 201. The controller includes an application with a command interface (not shown) to receive commands from the command server to control the interactive device locally. In contrast to prior art systems, which serve content to an interactive device from a centralized content server, all of the content in the system of the present invention is resident in the application at the interactive system, and commands only are served by the command server, reducing system load and bandwidth requirements.

Figure 3:
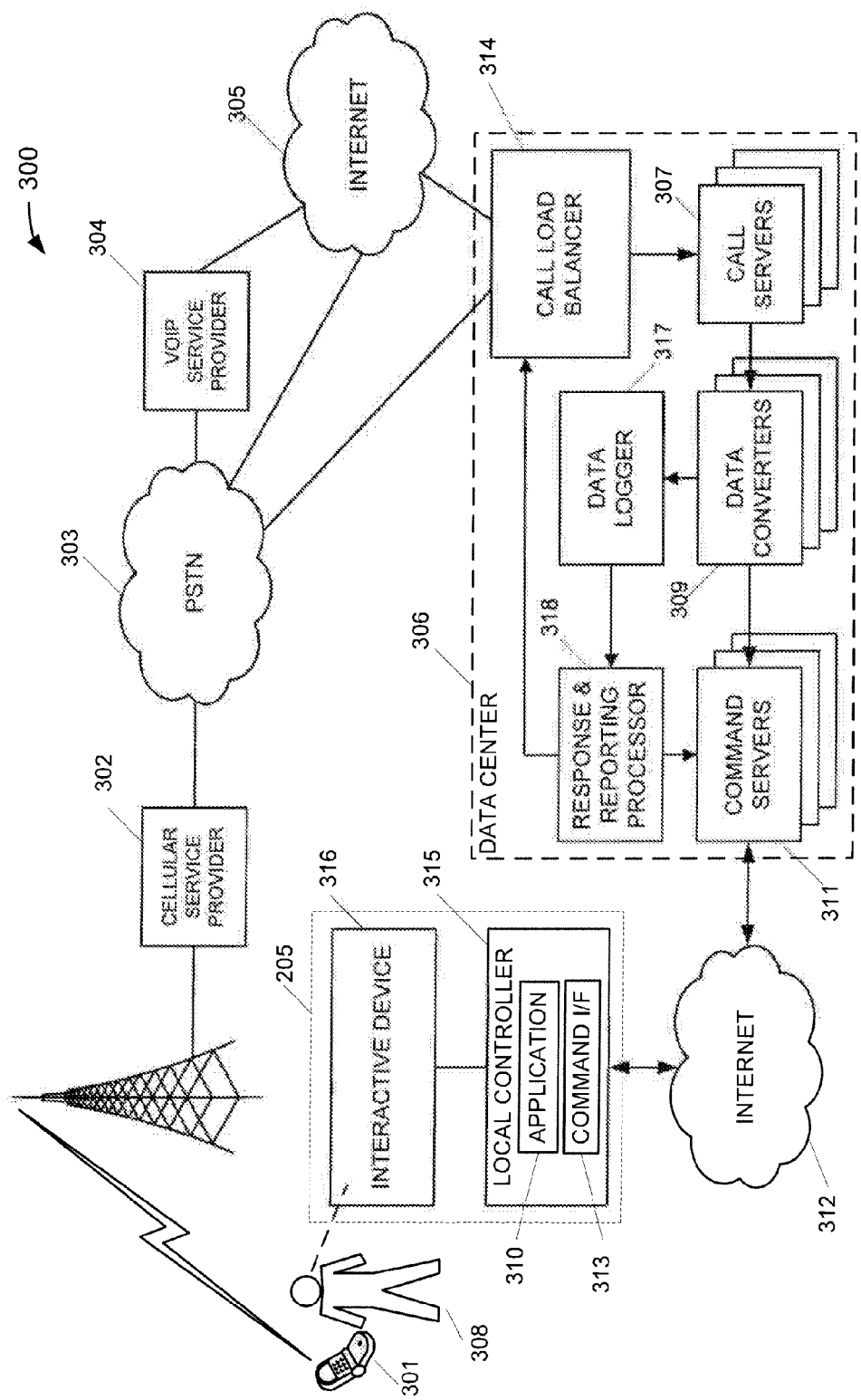
FIG. 3 illustrates an exemplary embodiment of a system of the present invention.

FIG. 3 illustrates an exemplary system 300 according to one embodiment of the present invention. System 300 illustrates the use of a mobile phone 301 as the communication device 201 and a cellular service provider 302 as one component of the first network (e.g., network 203). Other components of the first network may include the public switched telephone network (PSTN) 303, a VoIP service provider 304 and the Internet 305, where the communication path between the mobile phone 301 and a data center 306 may include, without limitation, an analog or DSL PSTN line or a TCP/IP line for example.

The data center 306 may be centralized or distributed. That is, all of the components of data center 306 may be collocated together or may be located in different locations and networked together. The data center 306 may include a number of call servers 307 configured to receive call data from communication devices, such as communication device 301, through the first network 203, where the call data represents the interactions of a user 308 with an interactive system 205. The number of call servers 307 may be scalable to manage a dynamic call load. Data center 306 may also include one or more data converters 309 coupled to the call servers, where a data converter is configured to convert the call data into commands for an application 310 running in the interactive system 205. the application 310 is local to the interactive system 205 and is configured to control the interactive system 205. Data center 306 also includes one or more command servers 311 coupled to the data converters 309. A command server 311 is configured to send the commands through a second network connection 312 (illustrated here for convenience as an internet connection) to a command interface 313, where the command interface 313 is configured to control the application 310.

Figure 8:
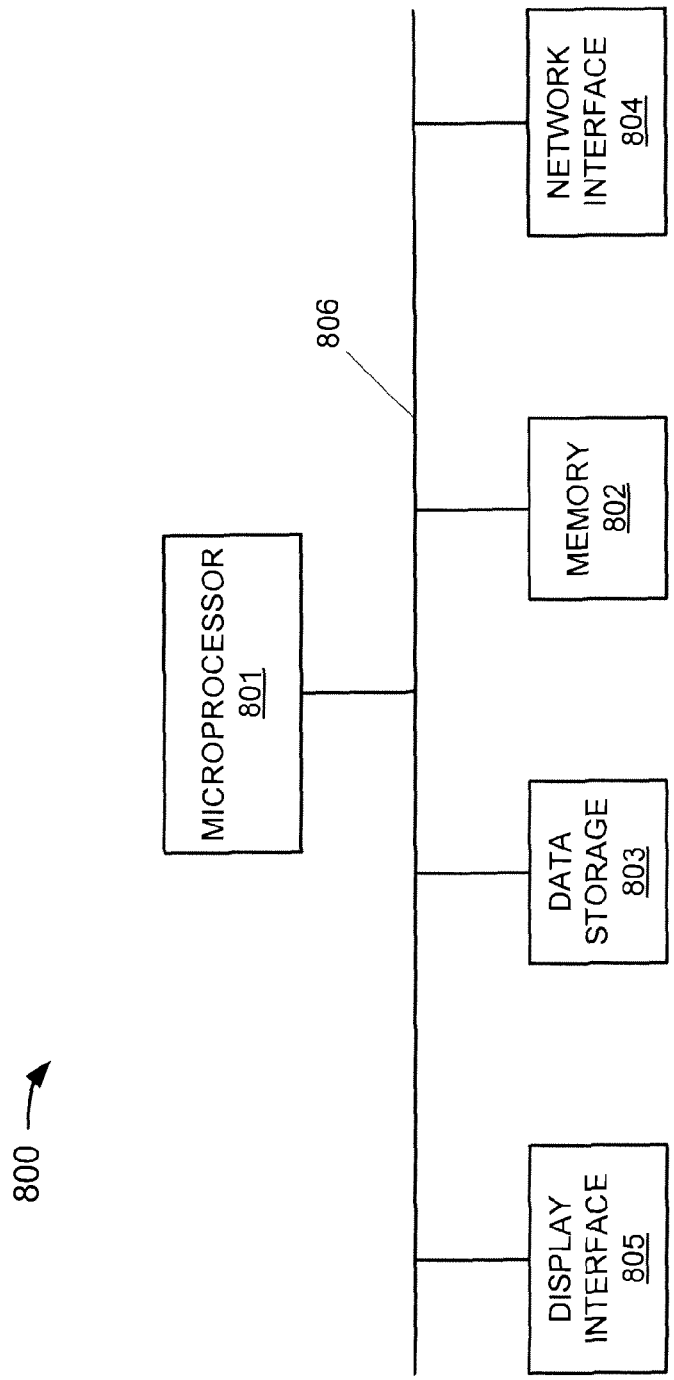
FIG. 8 is block diagram of a computer system according to one embodiment of the present invention.

In some embodiments, the data center may also include a load balancer 314 coupled with the call servers 307, where the load balancer 314 configured to receive the call data from the first network 203 and to distribute the call data to the call servers 307. In FIG. 3, the interactive system 205 includes the aforementioned application 310 and command interface 313 within a local controller 315 and an interactive device 316, which may be any electrical, mechanical or electro-mechanical device. Local controller 315 may be a general purpose or special purpose computer such as computer 800 as illustrated in FIG. 8, having a microprocessor 801, a memory 802, a data storage device 803, a network interface 804 and a display interface 805 interconnected on a bus 806.

The data center 306 may also include a data logger 317, coupled with the data converters 309. Data logger 317 may be configured to store user interactions and metadata associated with the user interactions as described below. The data center 306 may also include a response and reporting (R&R) module 318 coupled to the command server and the data logger, the R&R module 318 may be configured to generate custom responses to users based on the user interactions and the metadata associated with the user interactions and to generate billing data for the user interactions.

In one embodiment, the interactive device 316 in the interactive system 205 comprises a video display and the command server 311 is configured to send identification data to the application 310 to identify the video display to users. The video display displays an invitation to the users to call a telephone number or an SMS short code to initiate interaction with the interactive system 205. In one embodiment, the telephone number or SMS short code is selected from a pool of available numbers and codes, and the system is programmed to test the telephone number or SMS short code for validity prior to sending the identification data to the video display.

In one embodiment, the application 310 is configured to create an avatar for a user in response to commands from the command server 311 and to display the avatar on the video display for use in an interactive game. The avatar may be, for example, a portion of a user's telephone number, an image of the user or a recording of the user's voice. In one embodiment, where a team of users works together to play a game, as described in greater detail below, the application 310 may be configured to display an avatar on the video display to represent a number of users as a team. The application 310 may be configured to display the avatar in an interactive game on the video display and to control the avatar in response to key presses and voice commands from the user or users.

In one embodiment, the key presses comprise a 2-4-6-8 key constellation on the communication device to control up, left, right and down movements of the avatars, respectively, and the 5 key functions as action key. Additionally, a 1-3-7-9 key constellation on the communication device may operate to control diagonal movement of the avatars up and to the left, up and to the right, down and to the left and down and to the right, respectively. Users may also navigate to pages in a multi-page video display by using the "*" key to page forward and the "#" key to page back, for example. The application may also be configured to convert a user's multi-tap key presses to text messages on the video display when the communication device does not have a full QWERTY keyboard.

In one embodiment, the data logger 317 may be further configured to maintain a data log associated with a user's identification number (e.g., phone number); and the R&R 318 processor is further configured to generate custom audio or video feedback to the user based on data associated with the user. In one embodiment, the custom audio or video feedback can be delivered to the user via the user's communication device 301 as, for example, text messages, audio messages and as pictures or videos. Alternatively, custom audio or video may be generated locally by the application 310 based on commands from the command server 311.

In one embodiment, the application 310 may be a collective drawing game involving multiple users at the same or different locations, and the custom video feedback may be a collaborative wallpaper delivered to the communication device 301 of each user. In another embodiment, the application 310 may be a collective musical composition and the custom audio feedback may be a collaborative ring tone delivered to the communication device 301 of each user.

In one embodiment, the interactive device 316 may be static signage displaying a call-in telephone number or SMS short code and a user may be invited by the sign to call the telephone number or SMS short code. When the call is received the R&R processor 318 may be configured to identify the user and count the user's calls to the call-in telephone number or SMS short code, and to reward the user for loyalty when the count reaches a predetermined threshold. To reward the user, the R&R processor 318 may be configured to direct a call to the user's communication device 301, deliver a reward message and a reward code to the user, direct a call to a reward fulfillment agent, provide the reward fulfillment agent with the reward code, transfer the user to the reward fulfillment agent and verify the reward code. In order to verify the reward code, the R&R processor 318 may be configured to query the user for the reward code, log in to a designated website and enter the reward code and the user's telephone number.

In other embodiments, the interactive system 205 may be a set top box (STB), a personal computer (PC) or a gaming console running a game application where a plurality of users control the STB, PC or gaming console with a plurality of mobile phones connected to the interactive system 205 through cellular connections to the data center 306 and from the data center 306 through a cable, DSL and/or Wi-Fi connection to the interactive system 205.

In yet other embodiments, the interactive system 205 may be an electrical, mechanical or electromechanical system, where the application 310 is configured to control the interactive system 205 in response to commands from the communication device 301. In particular, in one embodiment, the interactive system 205 may be a residential or commercial building with systems such as electrical systems, heating and cooling systems, a security system and the like, where the systems are controlled interactively via a communication device 301 with the system of the present invention.

In one embodiment, as illustrated in FIG. 3, the system 300 may include two (or more) interactive systems 205 including a first display at a first location and a second display at a second location (e.g., at two different sporting venues), where a first application 310 is configured to invite users at the first location to register for an interactive game by mobile telephone, using voice, SMS messaging or email and a second application 310 is configured to invite users at the second location to register for the interactive game in the same way. The R&R processor 318 may be configured to select a first number of users at the first location and a second number of users at the second location to play the interactive game from users at the first and second locations who register to play the interactive game. The R&R processor 318 may also provide the users at the first location with a first access telephone number or code to participate in the interactive game and the users at the second location with a second access telephone number or code. The first and second applications 310 may be configured to display avatars for the first number of users and the second number of users on both the first display and the second display, wherein the first number of users and the second number of users are enabled to participate in the interactive game.

In one embodiment, the interactive system 205 may include a Bluetooth enabled play device having a Bluetooth connection to the communication device 301, where the play device is configured to detect DTMF signals generated by keystrokes on the communication device 301 and to transmit the DTMF signals to the data center 306 via a backchannel over the second network connection 206. At the data center 306, the DTMF signals can be translated to commands by a data converter 309 and transmitted by the command server 311 to the interactive system 205 over the second network connection 206, where the application 310 executes the commands.

In one embodiment, the interactive device 205 comprises a Bluetooth enabled utility meter configured to transmit DTMF tones corresponding to a meter reading to the communication device 301, where the communication device 301 is configured to send the DTMF tones through the first network connection 203 to a data converter 309, where the data converter 309 is configured to translate the DTMF tones into the meter reading, and where the R&R processor 318 is configured to transmit the meter reading to a billing application (not shown).

In one embodiment, the application 310 may be an interactive multi-user game and the custom audio or video feedback may include to the users may include an offer to sell a product related to the interactive game. Examples of an interactive multi-user game include a song rating game, a trivia game, a rock paper scissors game, a voice controlled horse racing game, a space invaders type game, a voice controlled car race game, a card game, a photo comparison game, a memory match game and the like. In one embodiment, the application may be a name that tune game, where a user listens to a song on the communication device 301 and makes a multiple choice selection from selections displayed on the video display of the interactive system.

In another embodiment, the application 310 could be a multi-person karaoke application on the interactive system 205, with the application 310 configured to play a combined audio output on the interactive system 205 from multiple users.

In another embodiment, the interactive system 205 may display a banner ad in a web page, where the application 310 is configured to display a telephone number in the banner ad. A call server 307 may be configured to receive a telephone call from a user viewing the banner ad. The R&R processor 318 may be configured to establish a geographic location of the user from the location of the user's communication device 301 (e.g., by GPS coordinates or cellular telephone site number) or a geolocation tag associated with the interactive system 205. The R&R processor 318 may also be configured to direct the telephone call to a vendor located within a specified distance of the user's geographic location.

In one embodiment, the interactive device 316 maybe a video display located at a conference, where the application 310 is configured to display a first confirmation code when a conference session begins and to display a second confirmation code when the conference session ends. The call server 307 may be configured to receive the first confirmation code and the second confirmation code from a user attending the session, and the R&R processor 318 may be configured to confirm the user's attendance at the conference session.

In one embodiment, the application 310 may be configured to display a presentation on the video display and to display a call-in number to the audience to rate the presentation. The R&R processor may be configured to receive ratings from the audience and to notify the presenter of the audience's ratings in real time.

In another embodiment, the interactive system 205 may include a theater screen where cell phone users have been reminded by a message on the theater screen to turn off their cell phones before a movie begins, where cell phones in the audience have been detected by one or more cellular systems and their respective telephone numbers have been reported to the data center 306 by the cellular carriers. The R&R processor 318 in the data center 306 may then be configured to place a call to the cell phones in the audience to determine if their cell phones have been turned off and, if their cell phones have not been turned off, to remind them again via the call.

In one embodiment of the present invention, the R&R processor 318 may include a player assistance function, where users who have successfully completed a game or other interactive challenge are solicited to call or message other users who have not successfully completed the game in order to assist the other players. Additionally, the R&R module may be configured to place a call to users who have completed an interaction to provide the users with coupon codes that may be used to claim prizes or promotional gifts.

Figure 4:
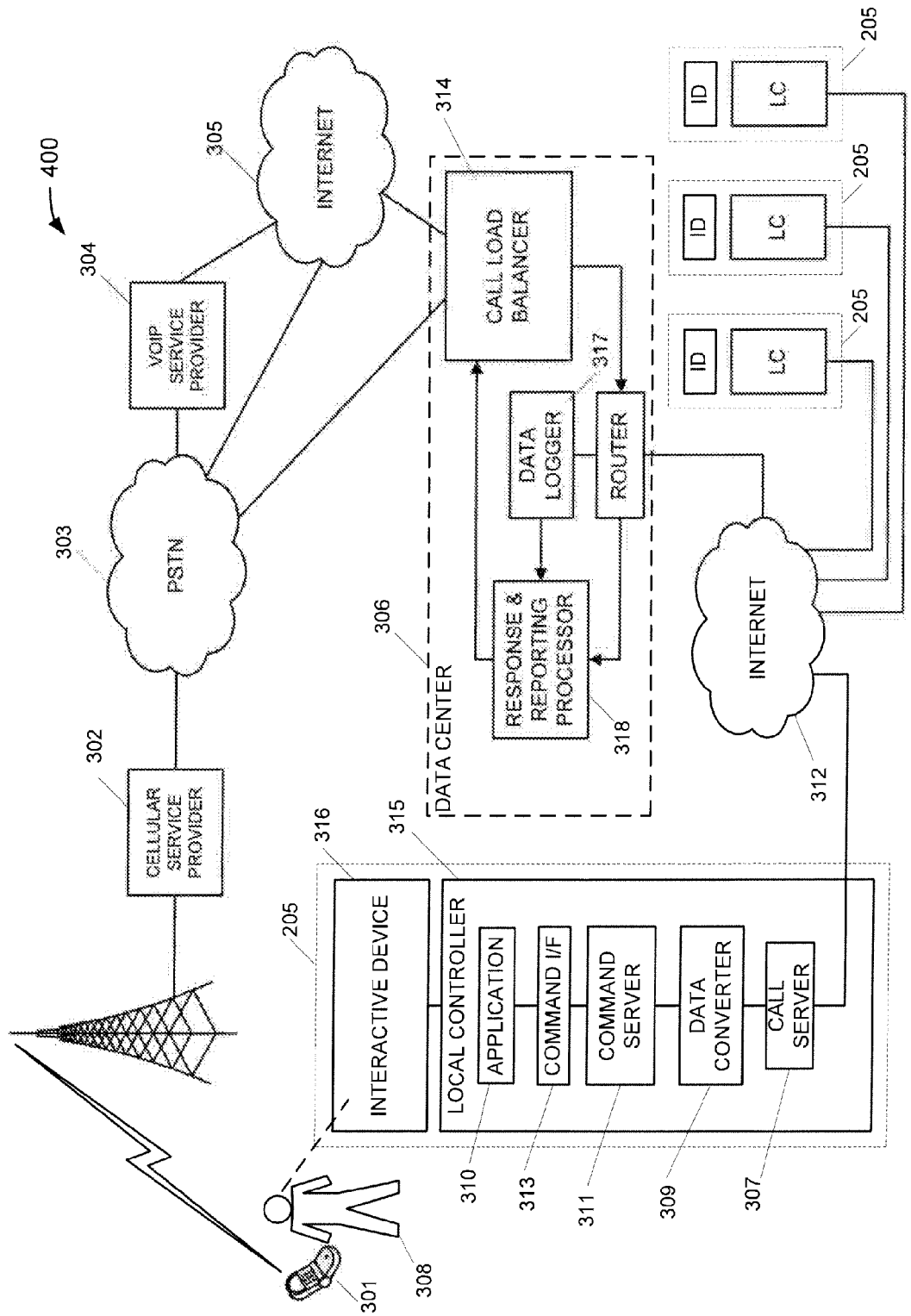
FIG. 4 illustrates an alternative embodiment of a system of the present invention.

In one embodiment, as illustrated in FIG. 4, a system 400 of the present invention may have certain components of the data center 306 decentralized. For example, one or more instances of call server 307, data converter 309 and command server 311 may reside in one or more respective interactive systems 205.

Figure 5:
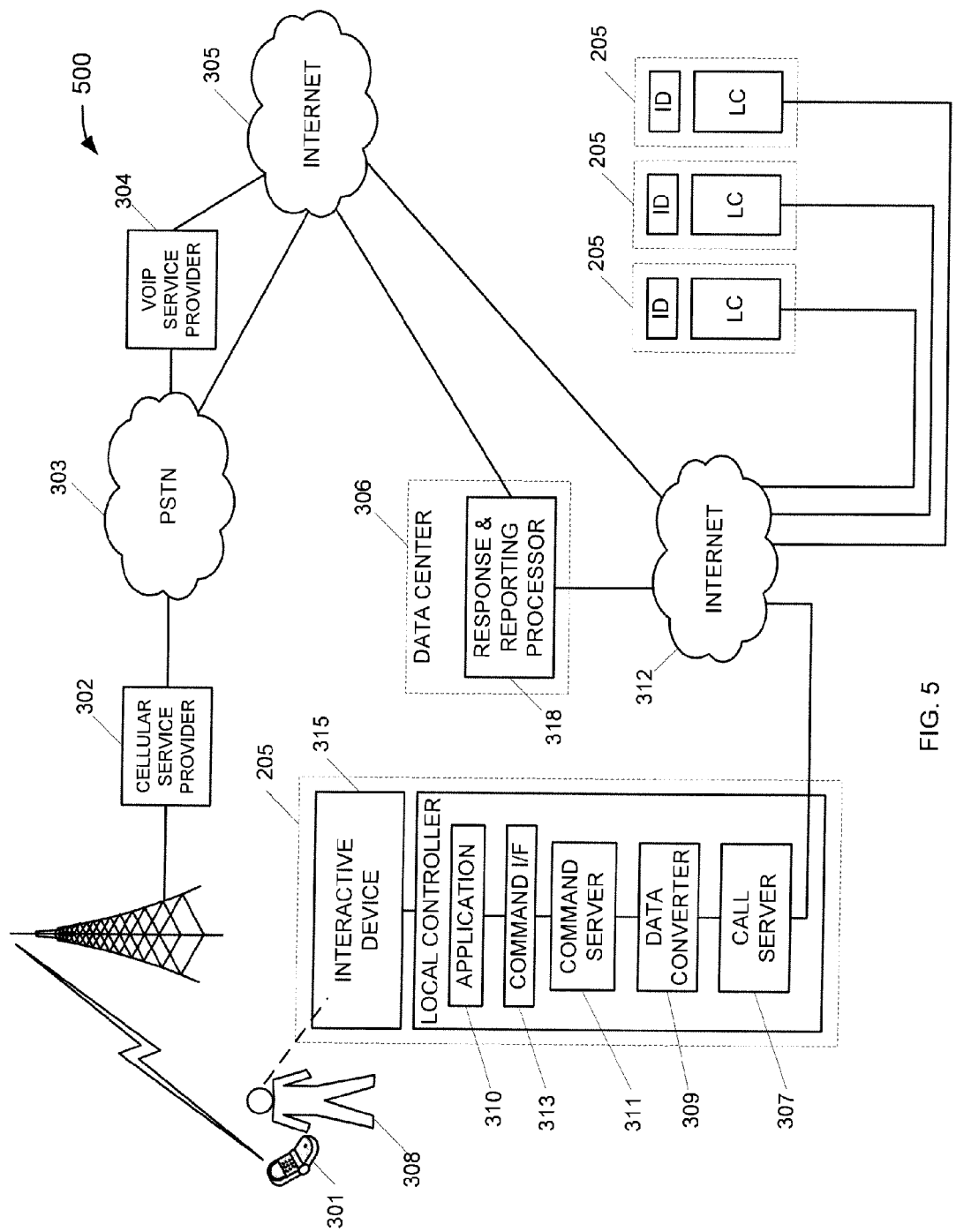
FIG. 5 illustrates another alternative embodiment of a system of the present invention.

In another embodiment, as illustrated in FIG. 5, in a system 500 of the present invention, the required functionality of the data center 306 may be reduced to that of the R&R processor 318 alone by, for example, routing user calls directly to individual interactive systems 205 and communicating with the R&R processor 318 via a backchannel from each of the interactive systems 205.

Figure 6:
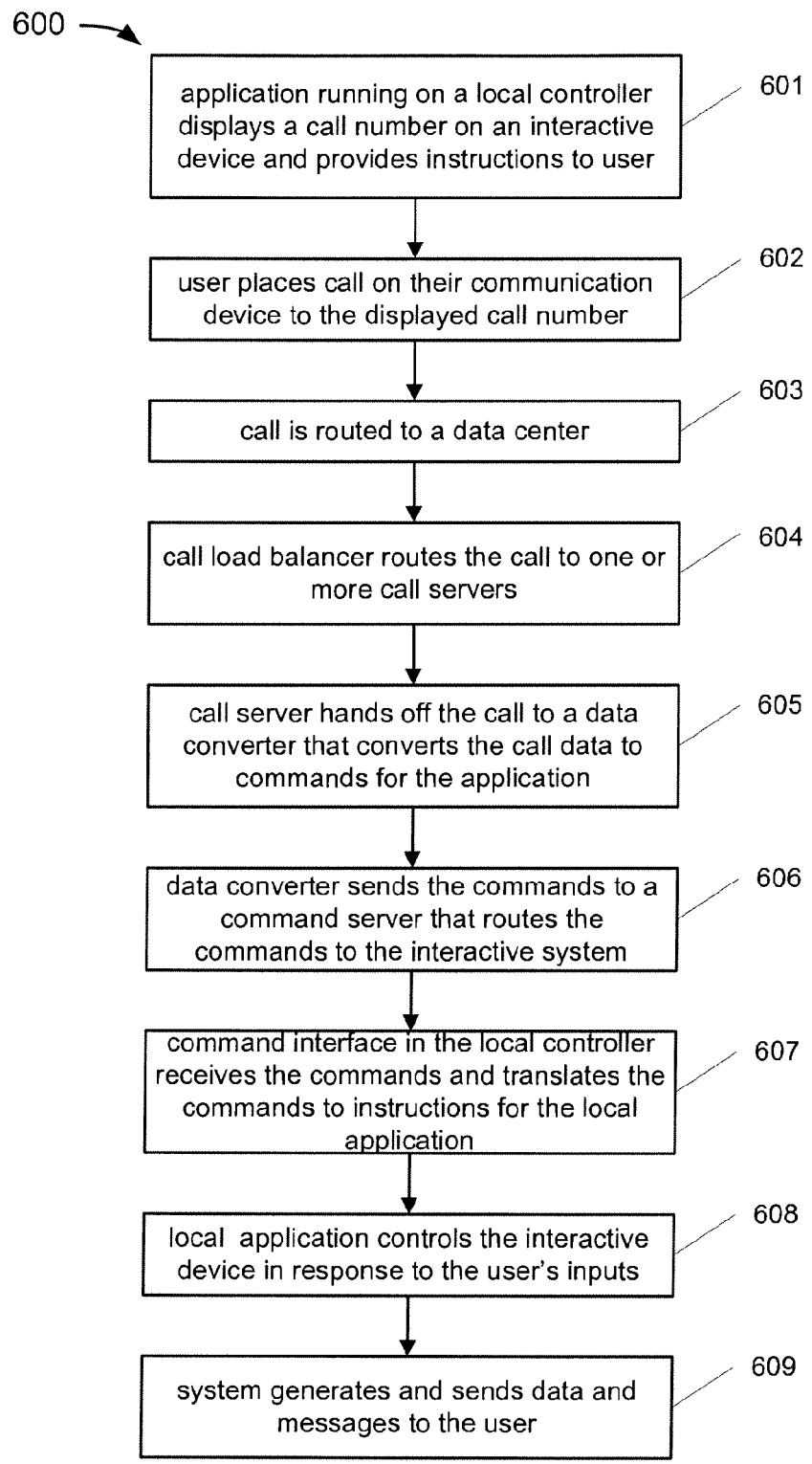
FIG. 6 is a flowchart illustrating a method according to one embodiment of the present invention.

FIG. 6 is a flowchart 600 illustrating a method according to one embodiment of the present invention. As illustrated in FIG. 6 at operation 601, an application (e.g., 310) running on a local controller (e.g., 315) displays a call number on an interactive device (e.g., 316) and provides instructions to users. At operation 602, users (e.g., 308) place calls on their communication devices (e.g., 301) to the displayed call number. At operation 603, the calls are routed to a data center (e.g., 306). At the data center, at operation 604, a call load balancer (e.g., 314) routes the calls to one or more call servers (e.g., 307). At operation 605, a call server hands off the call to a data converter (e.g., 309) that converts the call data to commands for the application. At operation 606, the data converter sends the commands to a command server (e.g., 311) that routes the commands to the interactive system. At operation 607, a command interface (e.g., 313) in the local controller receives the commands and translates the commands to instructions for the local application. At operation 6098, the local application controls the interactive device in response to the user's inputs. And at operation 609, the system generates and sends data and messages to the user.

Figure 7:
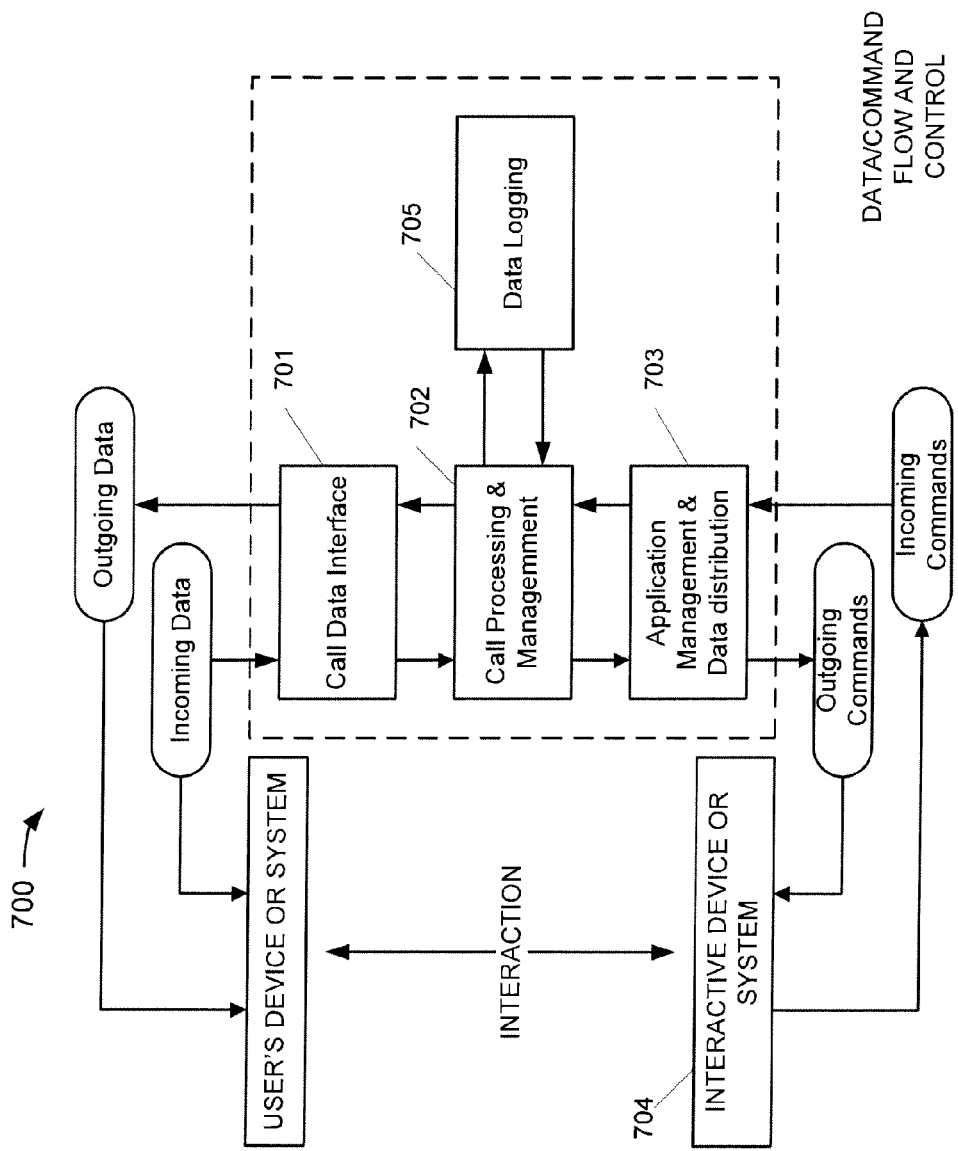
FIG. 7 is a functional block diagram illustrating an exemplary architecture of a system in one embodiment of the present invention.

FIG. 7 is a block diagram illustrating functional components of a system architecture 700 according to one embodiment of the present invention. The components illustrated in FIG. 7 may be logical components that may be implemented in software or firmware within one or more hardware components of a system, such as a computer system, for example. Alternatively, the components may be physical components including hardware, firmware and software to implement the respective functions. In one embodiment, the system of the present invention includes the following elements.

In FIG. 7, a call data interface component 701 receives inbound call data (e.g., voice, DTMF, SMS, MMS) and routes outbound call data. The incoming and outgoing call data may be routed over a conventional phone line, T1 line or DSL line on the public switched telephone network (PSTN). Alternatively, the call data may be routed through a VoIP provider.

A call processing and management component 702 is a module that processes inbound call data and extracts key press tones (DTMF) from a communication device such as a mobile phone and the audio stream from the communication device's microphone. The module takes each piece of data, either a key press or a segment of audio, and converts it to a data packet to be sent to the next part of the system. An audio analysis subcomponent processes the volume of the user's voice, pitch and phonemes in the user's speech, recognizes individual words, phrases and full sentences and the like. The audio analysis subcomponent sends information back to the communication device. This information may include SMS or MMS messages, prerecorded audio messages or audio recordings of one or more users. Call management functions may include disconnecting an in-progress call, dialing a new call, transferring a call, bridging a call between two users and the like.

An application management and data distribution component 703 maintains and broadcasts the state of applications at the locations of interactive systems. It accepts key press and voice data from the call processing component and uses programmable logic to determine which messages need to be passed forward to the output component or back to the call processing component based on the current inputs. This component can bill a user by processing the user's credit card, or other payment details, using data collected through a phone call. This component is capable of simultaneously receiving input data (e.g., data attached to SMS short codes) from multiple locations such as any networked interactive system installation where user access via a communication device (e.g., a mobile phone) is available, and routing the data to the proper interactive system.

The interactive device or system component 704 displays the state of the interactive system to callers. It may be a graphical application running on a computer display with connected speakers. As users in proximity to an interactive device or system press keys and send audio data, this part of the system receives commands for the local application and reflects the user inputs, for example, by changing the visuals on a display screen or changing audio output from an audio system. The interactive device of system component may also take the form of a mechanical or electro-mechanical device or system having a digital-to-analog converter. By way of illustration, and without limitation, instead of a screen changing state when a user sends a command, a servo motor can be activated to move a robotic arm.

A backchannel component (not shown) supports interactivity over channels that are not regular phone calls. This interactivity can include, for example, sending and receiving SMS messages (text) or MMS messages (multimedia) to or from a user, or sending to a user or allowing a user to download content for a mobile phone, such as ring tones, wallpapers, music, movies, games, and other applications. These files can be pre-made or can be custom generated on the fly based on application logic and a user's inputs. The backchannel component may also provide for billing a user for services over SMS.

The data logging component 705 stores all data about user interactions, and makes the data available for a number of different uses. Data collected may include a caller's telephone number, the time of the call, the duration of the call, the location of the call (e.g., based on the known location of the interactive system the caller is interacting with), each key pressed during the call, and any result of the user interaction (e.g., a subscription to a mobile mailing list or a prize award). Additionally, each interactive system or device may be tagged with demographic metadata information. For example, if the user is interacting with the system of the present invention at a nightclub, then that interaction is tagged with the concept of 'nightlife.' When an individual user calls in to the data logging component with experiences over time, the data and metadata about each interactive experience is attached to that user's record, building a user profile over time that may be used to offer products and services to the user.

The data logging component may provide this information to external systems in three different ways: 1) The owner or operator of the interactive installation can download the raw call data and user metadata or aggregates thereof for their own use. The data can be exported in a number of formats, such as Excel spreadsheets (.xls), Comma Separated Values (.csv), or Structured Query Language (.sql), for use in databases. The data can also be automatically transferred between systems at specified intervals; 2) When a user calls an interactive installation, the local application can query the data logging system to see if there is any data or metadata about the user, and can dynamically change the interactive experience. For example, the system may send commands to enable preferences previously selected by the user, or query a third party system (such as an advertising network) for content that would be relevant to the user and sending the content to the user's communication device; 3) When a user has performed some action in the system, then in real time the system can report to the backchannel component or a third party system the outcome of that event. For example, when the user has won a game, the system can be used to send them a prize code through SMS.

As described above and summarized below, various embodiments of the present invention may include at least the following features and capabilities:

Automatically distributing usernames and passwords: When a user views an interactive system with a displayed SMS short code, and the user calls the system for the first time, the system responds with a message, either through an audio channel or through SMS, with a PIN number or password. The user can use their phone number as a 'username' and the PIN or password to access the system and interact with the interactive display or device.

Multilocation interactivity: The application management and data distribution component enables multi-location interaction, such as a game played by players on big screens in different countries, where all users call to local phone numbers in their country, but appear on all screens at the same time. The state of the game is the same across all output channels.

Multimedia inputs and outputs: The system can send and receive audio data, button press data, SMS text messages, and MMS multimedia messages to and from a caller's mobile phone. Using this feature the system can collect and use various types of media from a user. For instance, the system requests a picture from a user, and then when the picture is received, that picture is stored with the user's personal data record, and is displayed on a screen as an avatar to represent the user. This can also be achieved with video and audio files. The system of the present invention can collect data through the buttons that user presses on their phone keypad (for instance, entering a birthday using digits, or entering text using the alphanumeric equivalent keys on a phone keypad). The system of the present invention can also collect data through voice recognition. All of this media is archived with the user's record, and can be retrieved by new installations, or requested by third party systems, such as websites, for display there.

Mailing lists: An application can use the audio and SMS backchannel to contact a user and request permission to add them to a mailing list.

Call transfer: An application can transfer an inbound call from a user within the system to an external phone system. For example, when a user wins a prize they can be connected to a customer service phone center to claim that prize.

External systems: An API (application programming interface) can be used by third party application providers to develop custom applications in a variety of programming languages. Additionally, the system can connect to existing software and hardware applications.

Prior data: The system can be integrated with existing databases to enhance the applications. For example, a database of phone numbers and user preferences that was not generated by the system can be provided by a third party, and when a call is received a user's record can be looked up and the application logic can change based on whether that user existed in the third party database, and what information was available to them. For example, in an installation that is intended only for a certain subset of users (for example, subscribers of a mobile telecommunications company), calls from users not in the database can be rejected, or can be treated differently than ones that are.

Customization: All components of the system can be customized based on variable application logic. This includes the rules of a specific application, and the sounds, images, or other outputs a user experiences.

Prize codes: Unique prize codes can be distributed through the system. These codes can be redeemed in a number of ways, including accessing a secure website, calling a phone number, visiting a physical location and the like.

Call generation: The system can generate calls to users who have interacted with the system, or who were listed in a third party database. Examples of this are a game that can call back the winning user after the game is over and the user has hang up, or an interactive reminder service that calls users on a schedule.

Scalability: The system can handle simultaneous inputs from thousands of users at the same time.

Voting: The system can be used to receive voting or poll data from all connected users simultaneously in real time.

Multiple outputs: The system can output to small or large displays, personal computers, or even live television.

User recognition system: When a user calls the system they may be represented by an avatar on screen. If so, they can be identified in a number of different ways. Part of their phone number may be displayed (usually the last 4 digits), they may be represented by a unique identifier, such a color or shape, which is communicated to them over the audio channel or through SMS or MMS over the backchannel, they may discover their user ID by sending in input data and deducing it from changing output data, a user's avatar may be automatically customized based data or metadata of the installation itself (such as which country a user is calling from based on which phone number they called). For example, in a interactive game with Japanese and British participants, each user's avatar could be enhanced with a flag of which country they are calling from. A user's avatar may be automatically customized based on data or metadata about the user themselves (such as which geographic area their phone number is from—for example changing their avatar based on which state or territory they are from, or using already collected data, such as a favorite sports team, to change their appearance or functions).

Call bridging: The system can bridge and unbridge the voice call between two connected users, allowing for anonymous communication.

Message bridging: The system can receive messages, such as SMS and MMS messages, intended for a user by another user, and forward them on as if they came from the system itself, thus protecting each user's personal information. In some cases, there may be too many users to distinguish among them on screen. In this case, user's may be represented anonymously, such as by a single pixel on a screen. In some instances, there may be too many users to represent uniquely on screen. In this case, users can be represented in aggregate, for instance as teams.

Call disconnection: The system can choose to end a call with a user. This can be done as a time limit on the interaction, or as part of the logic of a game or other application.

Local phone numbers: The system may be used with one local phone number being assigned to each output display. This allows it to feel 'closer to home' for a user, and does not incur the charges associated with 800 numbers.

Application switching and playlist programming: An application can be replaced or changed in real time depending on various inputs, including the inputs of a human operator or conditions within the application itself. Similarly, a playlist of applications to run in order can be developed.

Queuing: If an application is designed for a certain number of simultaneous participants, and there are too many connected, it can establish a waiting queue. This can be a visual queue displayed on a screen, or could be an audio queue where a user hears a message that they are waiting, and updates about their status.

Real time voice broadcasting: A user's voice input into their mobile phone can be broadcast in real time to all other connected users through their phones, through speakers, or streamed over a data channel such as a streaming audio system on the internet.

Real time video broadcasting: A user's video input can be broadcast in real time to other connected users through the video display device on their phones, through screens in the physical world, or streamed over a data channel such as a streaming video system on the internet.

Device customization: The features and functions of each application can be customized dependent on information that is collected about the nature and type of device that a caller is using to connect. For example, higher resolution images can be sent to users with larger mobile phone screens.

Input methodology: A phone's keypad is a 12 button direct digital input device, with the audio channel acting as an analog input device for both volume and pitch. The system can map the keys on the keypad directly to interface elements on screen. A simple example is a 'memory match' game, where there are 12 squares of hidden items containing 6 pairs of matching items. In this example, each button pressed on the phone directly affects a display element in the same general layout position on the section of the screen assigned to the user.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
    displaying an invitation to initiate interaction with an interactive system on a display, the invitation comprising a telephone number or SMS short code associated with a remote call intake system separate from the interactive system;
    receiving, at the call intake system, call data from a plurality of communication devices through at least one first network connection, wherein the call data originates from an interaction of a plurality of users with the interactive system in response to the invitation to initiate interaction with the interactive system, and wherein the call data comprises data based on at least one of telephone calls and text messages received from the plurality of users in response to the plurality of users calling the telephone number or entering the SMS short code associated with the remote call intake system;
    balancing and routing the call data to a plurality of call servers of the call intake system;
    converting the call data into commands for an application, wherein the application is configured to control the interactive system;
    sending the commands from a command server through a second network connection to a remote command interface, wherein the command interface is configured to control the application, wherein the application and the command interface reside on a local controller of the interactive system, wherein the local controller is configured to cause the interactive system to display content resident in the application in response to remote commands from the command server, and wherein the application is configured to locally generate custom audio or video based on the commands, the application providing the locally generated custom audio or video on at least one of the display or an audio system; and
    changing a number of call servers to which call data is routed based on a dynamic load to allow for changes in a number of communication devices from which call data is received.

2. The method of claim 1, wherein the plurality of communication devices comprise at least one of a mobile phone, a desktop computer and a laptop computer.

3. The method of claim 1, wherein the at least one first network connection comprises one or more of a cellular network connection, a PSTN switched circuit connection, a VoIP network connection, an IEEE 802.11 (Wi-Fi) network connection, a Bluetooth network connection and a TCP/IP network connection including an Internet connection.

4. The method of claim 1, wherein the call data represents one or more of a user's audio inputs and key press inputs.

5. The method of claim 1, wherein the second network connection comprises one or more of a TCP/IP network connection including an Internet connection, an IEEE 802.11 (Wi-Fi) network connection and a Bluetooth network connection.

6. The method of claim 1, wherein converting the call data into commands for the application comprises converting the call data into command data packets.

7. The method of claim 1, wherein the call data includes one or more of voice data, DTMF data, SMS data and MMS data.

8. The method of claim 1, wherein the interactive system comprises a video display, the method further comprising:
    sending identification data to the application to identify the video display to the user.

9. The method of claim 8, wherein the video display is configured to display a presentation, the method further comprising:
    displaying a call-in number to rate the presentation;
    receiving ratings from viewers of the presentation; and
    notifying a presenter of the viewers' ratings in real time.

10. The method of claim 8, wherein the video display is located at a conference, the method further comprising:
    displaying a first confirmation code when a conference session begins;
    displaying a second confirmation code when the conference session ends;
    receiving the first confirmation code and the second confirmation code from the user to confirm the user's attendance at the conference session.

11. The method of claim 8, wherein the application comprises a name that tune game, wherein a user listens to a song on played on the communication device and makes a multiple choice selection from selections displayed on the video display.

12. The method of claim 8, wherein the application comprises a multi-person karaoke application on the video display, wherein multiple users sing into their cell phones and a combined audio output is played at the video display.

13. The method of claim 8, further comprising:
    detecting a denial of service attack; and
    sending new identification data to be displayed by the interactive system.

14. The method of claim 8, wherein the telephone number or SMS short code is selected from a pool of available numbers and codes, the method further comprising testing the telephone number or SMS short code for validity prior to sending the identification data to the video display.

15. The method of claim 8, further comprising displaying an avatar on the video display to represent the user.

16. The method of claim 15, wherein the avatar comprises one of a portion of the user's telephone number, an image of the user and a recording of the user's voice.

17. The method of claim 15, wherein the avatar represents a plurality of users as a team.

18. The method of claim 8, wherein the application comprises an interactive game, the method further comprising controlling the interactive game on the video display by controlling the avatar with commands based on a user's key presses and voice commands.

19. The method of claim 18, wherein the interactive game comprises one of a song rating game, a trivia game, a rock paper scissors game, a voice controlled horse racing game, a space invaders type game, a voice controlled car race game, a card game, a photo comparison game and a memory match game.

20. The method of claim 18, further comprising:
maintaining a data log associated with a user's identification number; and
delivering custom audio or video feedback to the user based on data associated with the user.

21. The method of claim 20, wherein the custom audio or video feedback to the user comprises an offer to sell a product related to an interactive game.

22. The method of claim 20, wherein the custom audio or video is delivered to the user via the user's communication device.

23. The method of claim 20, wherein the custom audio or video is delivered to the user via the interactive system.

24. The method of claim 20, wherein the interactive game comprises a collective drawing game and the custom feedback comprises a collaborative wallpaper delivered to the communication device.

25. The method of claim 20, wherein the interactive game comprises a collective musical composition and the custom feedback comprises a collaborative ringtone delivered to the communication device.

26. The method of claim 18, wherein the key presses comprise a 2-4-6-8 key constellation on the communication device to control up, left, right and down movement of the avatar, respectively, and a 5 key comprises an action key.

27. The method of claim 18, wherein the key presses comprise a 1-3-7-9 key constellation on the communication device to control diagonal movement of the avatar up and to the left, up and to the right, down and to the left and down and to the right, respectively.

28. The method of claim 18, wherein the key presses comprise a "*" to page back on the video display and a "#" to page forward on the video display.

29. The method of claim 8, further comprising converting a user's multi-tap key presses to strings of text within the interactive application.

30. The method of claim 29, further comprising displaying the strings of text on the video display.

31. The method of claim 1, wherein the display comprises static signage displaying a call-in telephone number or SMS short code.

32. The method of claim 31, wherein the user calls the call-in telephone number or SMS short code, the method further comprising counting the user's calls or SMS messages and rewarding the user for loyalty when a count reaches a predetermined threshold.

33. The method of claim 32, wherein rewarding the user comprises:

calling the user's communication device and delivering a reward message and a reward code to the user;
calling a reward fulfillment agent and providing the reward fulfillment agent with the reward code;
transferring the user to the reward fulfillment agent; and
verifying of the reward code.

34. The method of claim 33, wherein verifying the reward code comprises:
querying the user for the reward code;
logging in to a designated website; and
entering the reward code and the user's telephone number.

35. The method of claim 34, wherein the reward fulfillment agent calls into a designated reward fulfillment phone application that is configured to accept the user's telephone number and reward code to determine validity and allow the agent to issue the reward.

36. The method of claim 1, wherein the interactive system comprises one of a set top box (STB), personal computer (PC) or gaming console running a game application, and wherein a plurality of users control the one of the STB, PC or gaming console with a plurality of mobile phones.

37. The method of claim 1, wherein the interactive system comprises an electrical, mechanical or electro-mechanical system, the method further comprising controlling the interactive system with at least one of the plurality of communication devices.

38. The method of claim 1, wherein the interactive system comprises a remote controlled building, the method further comprising controlling the remote controlled building with at least one of the plurality of communication devices.

39. The method of claim 1, wherein the interactive system comprises a first display at a first location, the method further comprising:
inviting users at the first location to register for an interactive game by telephone, SMS messaging or email;
selecting a first number of users at the first location to play the interactive game from users at the first location who register to play the interactive game; and
providing the first number of users at the first location with a first access telephone number or code to participate in the interactive game.

40. The method of claim 39, wherein the interactive system further comprises a second video display at a second location, the method further comprising:
inviting users at the second location to register for the interactive game by telephone, SMS messaging or email;
selecting a second number of users at the second location to play the interactive game from users at the second location who register to play the interactive game;
providing the second number of users at the second location with a second access telephone number or code to participate in the interactive game; and
displaying avatars for the first number of users and the second number of users on both the first display and the second display, wherein the first number of users and the second number of users participate in the interactive game.

41. The method of claim 1, wherein the interactive system further comprises a Bluetooth enabled play device having a Bluetooth connection to at least one of the plurality of communication devices, the method further comprising:
detecting DTMF signals generated by keystrokes on the at least one of the plurality of communication devices;
transmitting the DTMF signals via the second network connection to the command server;
converting the DTMF signals to commands; and sending the commands to the interactive system via the second network connection.

42. The method of claim 1, wherein the interactive system comprises a Bluetooth enabled utility meter configured to transmit DTMF tones corresponding to a meter reading to at least one of the plurality of communication devices, the method further comprising sending the DTMF tones to a billing application via the at least one first network connection.

43. The method of claim 1, wherein the interactive system is configured to display a banner advertisement in a web page, the method further comprising:
displaying a telephone number in the banner advertisement;
receiving a telephone call from a user viewing the banner advertisement;
establishing a geographic location of the user from one of the user's communication device location and a geolocation tag associated with the interactive system; and
directing the telephone call to a vendor located within a specified distance of the user's geographic location.

44. The method of claim 1, further comprising accessing third party marketing databases containing user identification and demographic data to generate commands for the local application that customize the application to the user.

45. The method of claim 1, further comprising:
queuing users in a call queue when call volume exceeds call capacity;
terminating inactive calls after a predetermined timeout period; and
bridging calls among two or more users.

46. A system, comprising:
an interactive system configured to display an invitation to initiate interaction with an interactive system on a display, the invitation comprising a telephone number or SMS short code;
a plurality of remote call servers separate from the interactive system and configured to receive call data from a plurality of communication devices through a first network connection, wherein the call data represents user interactions with the interactive system in response to the invitation to initiate interaction with the interactive system, and wherein the call data comprises data based on at least one of telephone calls and text messages received from the plurality of users in response to the plurality of users calling the telephone number or entering the SMS short code associated with the remote call intake system;
a load balancer coupled with the plurality of call servers, the load balancer configured to receive the call data from the first network connection and to distribute the call data to the plurality of call servers, wherein the load balancer is configured to scale a number of call servers to which call data is routed based on a dynamic call load to allow for changes in a number of communication devices from which call data is received;
a data converter coupled to the plurality of call servers, the data converter configured to convert the call data into commands for an application, wherein the application is local to an interactive system and is configured to control the interactive system; and
a command server coupled to the data converter, the command server configured to send the commands through a second network connection to a remote command interface, wherein the command interface is configured to control the application, wherein the application and the command interface reside on a local controller of the interactive system, wherein the local controller is configured to cause the interactive system to display content resident in the application in response to remote commands from the command server, and wherein the application is configured to locally generate custom audio or video based on the commands, the application providing the locally generated custom audio or video on at least one of the display or an audio system.

47. The system of claim 46, wherein at least one of the plurality of communication devices comprises one or more of a mobile phone, a desktop computer and a laptop computer.

48. The system of claim 46, wherein the first network connection comprises one or more of a cellular network connection, a PSTN switched circuit connection, a VoIP network connection, an IEEE 802.11 (Wi-Fi) network connection, a Bluetooth network connection and a TCP/IP network connection including an Internet connection.

49. The system of claim 46, wherein the call data includes one or more of voice data, DTMF data, SMS data and MMS data.

50. The system of claim 46, wherein the second network connection comprises one or more of a TCP/IP network connection including an Internet connection, an IEEE 802.11 (Wi-Fi) network connection and a Bluetooth network connection.

51. The system of claim 46, further comprising:
a data logger coupled to the data converter, the data logger configured to store user interactions and metadata associated with the user interactions; and
a response and reporting (R&R) module coupled to the command server and the data logger, the R&R module configured to generate custom responses to users based on the user interactions and the metadata associated with the user interactions and to generate billing data for the user interactions.

52. The system of claim 51, wherein the data logger is further configured to maintain a data log associated with a user's identification number; and the R&R module is further configured to generate custom audio or video feedback to the user based on data associated with the user.

53. The system of claim 52, wherein the application comprises a collective musical composition and wherein the custom audio feedback comprises a collaborative ringtone delivered to the communication device.

54. The system of claim 52, wherein the application comprises a collective drawing game and wherein the custom video feedback comprises a collaborative wallpaper delivered to the communication device.

55. The system of claim 52, wherein the command server is configured to send custom audio or video commands to the interactive system.

56. The system of claim 52, wherein one of the plurality of call servers is configured to deliver the custom audio or video feedback to the user via the user's communication device.

57. The system of claim 52, wherein the custom audio or video feedback to the user comprises an offer to sell a product related to the interactive game.

58. The system of claim 46, wherein the interactive system comprises a video display, wherein the command server is configured to send identification data to the application to identify the video display, and wherein the video display displays the invitation to the users to call a telephone number or an SMS short code to initiate interaction with the interactive system.

59. The system of claim 58, wherein the application is configured to convert a user's multi-tap key presses to text messages on the video display.

60. The system of claim 58, wherein the application is configured to create an avatar for a user in response to commands from the command server and to display the avatar on the video display for use in an interactive game.

61. The system of claim 60, wherein the avatar comprises one of a portion of a user's telephone number, an image of the user and a recording of the user's voice.

62. The system of claim 60, wherein the application is configured to display an avatar on the video display to represent a number of users as a team.

63. The system of claim 58, wherein the video display is located at a conference, wherein the application is configured to display a first confirmation code when a conference session begins, display a second confirmation code when the conference session ends, the call server is configured to receive the first confirmation code and the second confirmation code from the user, and the R&R module is configured to confirm the user's attendance at the conference session.

64. The system of claim 58, wherein the application is configured to display a presentation on the video display and to display a call-in number to rate the presentation, and wherein the R&R module is configured to receive ratings from viewers of the presentation and to notify a presenter of the viewers' ratings in real time.

65. The system of claim 58, wherein the application is configured to display the avatar in an interactive game on the video display and to control the avatar in response to key presses and voice commands from the user.

66. The system of claim 65, wherein the key presses comprise a 2-4-6-8 key constellation on the communication device of the user to control up, left, right and down movements of the avatars, respectively, and a 5 key comprises an action key.

67. The system of claim 65, wherein the key presses comprise a 1-3-7-9 key constellation on the communication device of the user to control diagonal movement of the avatars up and to the left, up and to the right, down and to the left and down and to the right, respectively.

68. The system of claim 65, wherein the key presses comprise a "*" to page back on the video display and a "#" to page forward on the video display.

69. The system of claim 46, wherein the telephone number or SMS short code is selected from a pool of available numbers and codes, the method further comprising testing the telephone number or SMS short code for validity prior to sending the identification data to the video display.

70. The system of claim 46, wherein the application comprises a name that tune game, wherein a user listens to a song on the communication device of the user and makes a multiple choice selection from selections displayed on the video display.

71. The system of claim 46, wherein the interactive system comprises a banner ad in a web page, wherein the application is configured to display a telephone number in the banner ad, a call server is configured to receive a telephone call from a user viewing the banner ad, the R&R module is configured to establish a geographic location of the user from one of the user's communication device location and a geolocation tag associated with the interactive system and to direct the telephone call to a vendor located within a specified distance of the user's geographic location.

72. The system of claim 46, wherein the display comprises static signage displaying a call-in telephone number or SMS short code.

73. The system of 72, wherein in the R&R module is configured to count a user's calls to the call-in telephone number or SMS short code, and to reward the user for loyalty when a count reaches a predetermined threshold.

74. The system of claim 73, wherein to reward the user the R&R module is configured to:
direct a call to the user's communication device;
deliver a reward message and a reward code to the user;
direct a call to a reward fulfillment agent;
provide the reward fulfillment agent with the reward code;
transfer the user to the reward fulfillment agent; and
verify the reward code.

75. The method of claim 74, wherein to verify the reward code, the R&R module is configured to:
query the user for the reward code;
log in to a designated website; and
enter the reward code and the user's telephone number.

76. The system of claim 46, wherein the interactive system comprises a theater screen and wherein users have been reminded by a message on the theater screen to turn off their cell phones before a movie begins, wherein the R&R module is configured to place a call to users to determine if their cell phones have been turned off and, if their cell phones have not been turned off, to remind them again via the call.

77. The system of claim 46, wherein the R&R module includes a player assistance function, wherein users who have successfully completed a game or other interactive challenge are solicited to call or message other users who have not successfully completed the game in order to assist the other players.

78. The system of claim 46, wherein the interactive system comprises one of a set top box (STB), personal computer (PC) or gaming console running a game application, and wherein a plurality of users control the one of the STB, PC or gaming console with a plurality of mobile phones.

79. The system of claim 46, wherein the interactive system comprises an electrical, mechanical or electro-mechanical system, and wherein the application is configured to control the interactive system in response to commands from at least one of the plurality of communication devices.

80. The system of claim 46, wherein the interactive system comprises a remote controlled building, and wherein the application is configured to control the remote controlled building with at least one of the plurality of communication devices.

81. The system of claim 46, wherein the interactive system comprises a first display at a first location, wherein:
a first application is configure to invite users at the first location to register for an interactive game by telephone, SMS messaging or email; and
the R&R module is configured to select a first number of users at the first location to play the interactive game from users at the first location who register to play the interactive game, and to provide the first number of users at the first location with a first access telephone number or code to participate in the interactive game.

82. The system of claim 81, wherein the interactive system further comprises a second display at a second location, wherein
a second application is configured to invite users at the second location to register for the interactive game by telephone, SMS messaging or email;
the R&R module is configured to select a second number of users at the second location to play the interactive game from users at the second location who register to play the interactive game, and to provide the second number of users at the second location with a second access telephone number or code to participate in the interactive game; and wherein the first and second applications are configured to display avatars for the first number of users and the second number of users on both the first display and the second display, wherein the first number of users and the second number of users are enabled to participate in the interactive game.

83. The system of claim 46, wherein the R&R module is configured to place a call to users who have completed an interaction to provide the users with coupon codes that may be used to claim prizes or promotional gifts.

84. The system of claim 46, wherein the interactive system further comprises a Bluetooth enabled play device having a Bluetooth connection to at least one of the plurality of communication devices, wherein the play device is configured to:
　detect DTMF signals generated by keystrokes on the at least one of the plurality of communication devices;
　transmit the DTMF signals via the second network connection to the command server;
　convert the DTMF signals to commands; and
　send the commands to the interactive system via the second network connection.

85. The system of claim 46, wherein the interactive device comprises a Bluetooth enabled utility meter configured to transmit DTMF tones corresponding to a meter reading to at least one of the plurality of communication devices, wherein the at least one of the plurality of communication devices is configured to send the DTMF tones through the first network connection to the data converter, wherein the data converter is configured to translate the DTMF tones into the meter reading, and wherein the R&R module is configured to transmit the meter reading to a billing application.

86. The system of claim 46, wherein the application comprises an interactive game comprising one of a song rating game, a trivia game, a rock paper scissors game, a voice controlled horse racing game, a space invaders type game, a voice controlled car race game, a card game, a photo comparison game, a memory match game.

87. The system of claim 46, wherein the application comprises a multi-person karaoke application on the interactive system, the application configured to play a combined audio output on the interactive system from multiple users.

88. One or more non-transitory computer readable media having instructions thereon that, when executed by at least one processor, cause the at least one processor to perform operations comprising:
　displaying an invitation to initiate interaction with an interactive system on a display, the invitation comprising a telephone number or SMS short code associated with a remote call intake system separate from the interactive system;
　receiving, at the call intake system, call data from a plurality of communication devices through at least one first network connection, wherein the call data originates from an interaction of a plurality of users with the interactive system in response to the invitation to initiate interaction with the interactive system, and wherein the call data comprises data based on at least one of telephone calls and text messages received from the plurality of users in response to the plurality of users calling the telephone number or entering the SMS short code associated with the remote call intake system;
　balancing and routing the call data to a plurality of call servers of the call intake system;
　converting the call data into commands for an application, wherein the application is configured to control the interactive system;
　sending the commands from a command server through a second network connection to a remote command interface, wherein the command interface is configured to control the application, wherein the application and the command interface reside on a local controller of the interactive system, wherein the local controller is configured to cause the interactive system to display content resident in the application in response to remote commands from the command server, and wherein the application is configured to locally generate custom audio or video based on the commands, the application providing the locally generated custom audio or video on at least one of the display or an audio system; and
　changing a number of call servers to which call data is routed based on a dynamic load to allow for changes in a number of communication devices from which call data is received.

89. The one or more non-transitory computer readable media of claim 88, wherein the interactive system comprises a video display, further including instructions that cause the at least one processor to perform operations comprising:
　sending identification data to the application to identify the video display to the user
　telephone number or SMS short code to initiate interaction with the interactive system are displayed on the video display.

90. The one or more non-transitory computer readable media of claim 89, wherein the interactive system further comprises a Bluetooth enabled play device having a Bluetooth connection to the communication device, further including instructions that cause the at least one processor to perform operations comprising:
　detecting DTMF signals generated by keystrokes on the communication device;
　transmitting the DTMF signals via the second network connection to the command server;
　converting the DTMF signals to commands; and
　sending the commands to the interactive system via the second network connection.

91. The one or more non-transitory computer readable media of claim 59, wherein the telephone number or SMS short code is selected from a pool of available numbers and codes, further including instructions that cause the at least one processor to perform operations comprising testing the telephone number or SMS short code for validity prior to sending the identification data to the video display.

92. The one or more non-transitory computer readable media of claim 89, wherein the video display is configured to display a presentation, further including instructions that cause the at least one processor to perform operations comprising:
　displaying a call-in number to rate the presentation;
　receiving ratings from viewers of the presentation; and
　notifying a presenter of the viewers' ratings in real time.

93. The one or more non-transitory computer readable media of claim 89, wherein the video display is located at a conference, further including instructions that cause the at least one processor to perform operations comprising:
　displaying a first confirmation code when a conference session begins;
　displaying a second confirmation code when the conference session ends;
　receiving the first confirmation code and the second confirmation code from the user to confirm the user's attendance at the conference session.

94. The one or more non-transitory computer readable media of claim 89, further including instructions that cause the at least one processor to perform operations comprising displaying an avatar on the video display to represent the user.

95. The one or more non-transitory computer readable media of claim 94, wherein the avatar comprises one of a portion of the user's telephone number, an image of the user and a recording of the user's voice.

96. The one or more non-transitory computer readable media of claim 94, further including instructions that cause the at least one processor to perform operations comprising playing an interactive game on the video display by controlling the avatar with commands based on a user's key presses and voice commands.

97. The one or more non-transitory computer readable media of claim 96, wherein the key presses comprise a 2-4-6-8 key constellation on the communication device to control up, left, right and down movement of the avatar, respectively, and a 5 key comprises an action key.

98. The one or more non-transitory computer readable media of claim 96, wherein the key presses comprise a 1-3-7-9 key constellation on the communication device to control diagonal movement of the avatar up and to the left, up and to the right, down and to the left and down and to the right, respectively.

99. The one or more non-transitory computer readable media of claim 96, wherein the key presses comprise an "*" to page back on the video display and a "#" to page forward on the video display.

100. The one or more non-transitory computer readable media of claim 96, wherein the interactive game comprises a collective drawing game and the custom feedback comprises a collaborative wallpaper delivered to the communication device.

101. The one or more non-transitory computer readable media of claim 96, wherein the interactive game comprises a collective musical composition and the custom feedback comprises a collaborative ringtone delivered to the communication device.

102. The non-transitory computer readable medium of claim 89, further including instructions that cause the at least one processor to perform operations comprising displaying an avatar on the video display to represent a plurality of users as a team.

103. The one or more non-transitory computer readable media of claim 89, further including instructions that cause the at least one processor to perform operations comprising converting a user's multi-tap key presses to strings of text within the interactive application.

104. The one or more non-transitory computer readable media of claim 103, further including instructions that cause the at least one processor to perform operations comprising displaying the strings of text on the video display.

105. The one or more non-transitory computer readable media of claim 89, further including instructions that cause the at least one processor to perform operations comprising:
maintaining a data log associated with a user's identification number; and
delivering custom audio or video feedback to the user based on data associated with the user.

106. The one or more non-transitory computer readable media of claim 105, wherein the custom audio or video is delivered to the user via the user's communication device.

107. The one or more non-transitory computer readable media of claim 105, wherein the custom audio or video is delivered to the user via the interactive system.

108. The one or more non-transitory computer readable media of claim 88, wherein the display comprises static signage displaying a call-in telephone number or SMS short code.

109. The one or more non-transitory computer readable media of claim 108, wherein the user calls the call-in telephone number or SMS short code, further including instructions that cause the at least one processor to perform operations comprising counting the user's telephone calls or SMS messages and rewarding the user for loyalty when a count reaches a predetermined threshold.

110. The one or more non-transitory computer readable media of claim 109, wherein rewarding the user comprises:
calling the user's communication device and delivering a reward message and a reward code to the user;
calling a reward fulfillment agent and providing the reward fulfillment agent with the reward code;
transferring the user to the reward fulfillment agent; and
verifying of the reward code.

111. The one or more non-transitory computer readable media of claim 110, wherein verifying the reward code comprises:
querying the user for the reward code;
logging in to a designated website; and
entering the reward code and the user's telephone number.

112. The one or more non-transitory computer readable media of claim 88, wherein the interactive system comprises one of a set top box (STB), personal computer (PC) or gaming console running a game application, and wherein a plurality of users controls the one of the STB, PC or gaming console with a plurality of mobile phones.

113. The one or more non-transitory computer readable media of claim 88, wherein the interactive system comprises an electrical, mechanical or electro-mechanical system, the method further comprising controlling the interactive system with the communication device.

114. The one or more non-transitory computer readable media of claim 88, wherein the interactive system comprises a remote controlled building, the method further comprising controlling the remote controlled building with the communication device.

115. The one or more non-transitory computer readable media of claim 88, wherein the video display comprises a first display at a first location, further including instructions that cause the at least one processor to perform operations comprising:
inviting users at the first location to register for an interactive game by telephone, SMS messaging or email;
selecting a first number of users at the first location to play the interactive game from users at the first location who register to play the interactive game; and
providing the first number of users at the first location with a first access telephone number or code to participate in the interactive game.

116. The one or more non-transitory computer readable media of claim 115, wherein the interactive system further comprises a second display at a second location, further including instructions that cause the at least one processor to perform operations comprising:
inviting users at the second location to register for the interactive game by telephone, SMS messaging or email;
selecting a second number of users at the second location to play the interactive game from users at the second location who register to play the interactive game;

providing the second number of users at the second location with a second access telephone number or code to participate in the interactive game; and displaying avatars for the first number of users and the second number of users on both the first display and the second display, wherein the first number of users and the second number of users participate in the interactive game.

117. The one or more non-transitory computer readable media of claim 89, wherein the interactive device comprises a Bluetooth enabled utility meter configured to transmit DTMF tones corresponding to a meter reading to the communication device, further including instructions that cause the at least one processor to perform operations comprising sending the DTMF tones to a billing application via the first network connection.

118. The one or more non-transitory computer readable media of claim 88, wherein the advertisement comprises a banner advertisement in a web page, further including instructions that cause the at least one processor to perform operations comprising:

displaying a telephone number in the banner advertisement;

receiving a telephone call from a user viewing the banner advertisement;

establishing a geographic location of the user from one of the user's communication device location and a geolocation tag associated with the interactive system; and directing the telephone call to a vendor located within a specified distance of the user's geographic location.

* * * * *

UNITED STATES PATENT AND TRADEMARK OFFICE
CERTIFICATE OF CORRECTION

Page 1 of 1

PATENT NO. : 8,897,737 B2
APPLICATION NO. : 12/336406
DATED : November 25, 2014
INVENTOR(S) : Jury Hahn and Daniel Albritton It is certified that error appears in the above-identified patent and that said Letters Patent is hereby corrected as shown below:

In the Claims

Column 22:

Line 41, please remove --claim 59,-- before "wherein the"
Line 41, please insert --claim 89,-- before "wherein the"

Column 25:

Line 10, please remove --claim 89,-- before "wherein the"
Line 10, please insert --claim 88,-- before "wherein the"

Signed and Sealed this
Sixteenth Day of June, 2015

Michelle K. Lee
*Director of the United States Patent and Trademark Office*